(12) United States Patent
Zhang

(10) Patent No.: US 10,426,145 B2
(45) Date of Patent: Oct. 1, 2019

(54) WAVE-MAKING PUMP WITH NOVEL DIRECTIONAL STRUCTURE

(71) Applicant: ShenZhen Honya Aquarium Equipments Manufacturer Co., Ltd., Guangdong (CN)

(72) Inventor: Xiao Jun Zhang, Guangdong (CN)

(*) Notice: Subject to any disclaimer, the term of this patent is extended or adjusted under 35 U.S.C. 154(b) by 27 days.

(21) Appl. No.: 15/860,585

(22) Filed: Jan. 2, 2018

(65) Prior Publication Data

US 2019/0200586 A1   Jul. 4, 2019

(51) Int. Cl.
| | |
|---|---|
| A63B 69/12 | (2006.01) |
| A01K 63/04 | (2006.01) |
| A01K 63/00 | (2017.01) |
| F04D 29/60 | (2006.01) |
| F04D 29/40 | (2006.01) |

(52) U.S. Cl.
CPC .......... *A01K 63/047* (2013.01); *A01K 63/006* (2013.01); *F04D 29/406* (2013.01); *F04D 29/605* (2013.01)

(58) Field of Classification Search
CPC .. A01K 63/047; A01K 63/006; F04D 29/406; F04D 29/605
USPC ................ 417/423.12, 423.11, 423.3, 424.1; 310/86, 87, 90.5; 405/21, 79, 80
See application file for complete search history.

(56) References Cited

U.S. PATENT DOCUMENTS

| | | | | | |
|---|---|---|---|---|---|
| 3,447,475 | A | * | 6/1969 | Blum ...................... | F04D 7/045 415/121.1 |
| 3,717,420 | A | * | 2/1973 | Rachocki ................ | F04D 13/08 417/12 |
| 3,751,698 | A | * | 8/1973 | Walker ................... | H02K 5/128 310/126 |
| 4,561,133 | A | * | 12/1985 | Laing .................... | A63B 69/125 4/491 |
| 5,075,014 | A | * | 12/1991 | Sullivan ................ | E02B 15/106 210/747.6 |
| 5,425,624 | A | * | 6/1995 | Williams ............... | F04B 49/025 222/64 |
| 5,679,035 | A | * | 10/1997 | Jordan ................... | B63H 11/08 440/47 |
| 5,746,054 | A | * | 5/1998 | Matte ....................... | F01N 3/04 440/88 J |

(Continued)

*Primary Examiner* — Benjamin F Fiorello
*Assistant Examiner* — Edwin J Toledo-Duran
(74) *Attorney, Agent, or Firm* — Prakash Nama; Global IP Services, PLLC

(57) ABSTRACT

The utility model provides a wave-making pump with a novel directional structure, comprising a casing, a motor, an impeller and a fixing device, wherein the motor is fixed in the casing; the impeller is arranged at the output end of the motor; the fixing device is used for fixing the casing; the casing comprises a rear casing and a diversion protective cover arranged on the front side of the rear casing; openings are formed in the two ends of the diversion protective cover; a hollow groove helically extending is formed in the peripheral surface of the diversion protective cover. As the hollow groove helically extending is formed in the peripheral surface of the diversion protective cover, the water flow produced by wave-making pump with the novel directional structure is wider, softer and more uniform, and the aquatic environment closer to the natural ecological water wave is convenient to create.

6 Claims, 3 Drawing Sheets

(56) References Cited

U.S. PATENT DOCUMENTS

| | | | | |
|---|---|---|---|---|
| 5,833,437 A * | 11/1998 | Kurth | F04D 13/024 | 417/36 |
| 6,488,401 B1 * | 12/2002 | Seaman | B01F 5/0218 | 239/240 |
| 6,991,362 B1 * | 1/2006 | Seaman | B01F 5/0218 | 239/240 |
| 7,743,734 B2 * | 6/2010 | Tunze | A01K 63/006 | 119/247 |
| 2001/0053330 A1 * | 12/2001 | Ozaki | F04D 13/0666 | 417/420 |
| 2002/0009363 A1 * | 1/2002 | Ozaki | F02K 7/06 | 415/203 |
| 2002/0026928 A1 * | 3/2002 | Korenjak | F01M 11/02 | 123/572 |
| 2002/0038546 A1 * | 4/2002 | Yamanaka | B23P 15/00 | 60/330 |
| 2002/0076337 A1 * | 6/2002 | Rexroth | F04D 29/588 | 417/365 |
| 2003/0091440 A1 * | 5/2003 | Patel | F04B 39/121 | 417/12 |
| 2005/0029817 A1 * | 2/2005 | Gizara | F03B 17/061 | 290/43 |
| 2005/0214109 A1 * | 9/2005 | Grande, III | F01D 1/36 | 415/90 |
| 2009/0321498 A1 * | 12/2009 | Zen | B23K 3/0653 | 228/37 |
| 2010/0251692 A1 * | 10/2010 | Kinde, Sr. | F02K 5/026 | 60/226.1 |
| 2011/0052432 A1 * | 3/2011 | Cunningham | F04D 13/10 | 417/423.3 |
| 2012/0048813 A1 * | 3/2012 | Irvin, Sr. | C02F 1/005 | 210/787 |
| 2012/0150291 A1 * | 6/2012 | Aber | H02J 7/025 | 623/3.14 |
| 2012/0227389 A1 * | 9/2012 | Hinderks | F01B 1/10 | 60/317 |
| 2014/0209292 A1 * | 7/2014 | Watson | F04D 29/086 | 166/105 |
| 2015/0295397 A1 * | 10/2015 | Lin | F16M 11/046 | 4/491 |
| 2016/0290340 A1 * | 10/2016 | Maurino | F01P 3/20 | |
| 2017/0248141 A1 * | 8/2017 | Liang | F04D 1/12 | |

* cited by examiner

WAVE-MAKING PUMP WITH NOVEL DIRECTIONAL STRUCTURE

BACKGROUND OF THE INVENTION

The utility model is related to the technical field of wave generators, in particular to a wave-making pump, with a novel directional structure, for creating near natural ecological water waves.

Generally, a wave-making pump is widely applied to aquatic landscape and aquaculture, and belongs to indispensable equipment in aquatic and fishery industries. The wave-making pump can be used for simulating and making water flow and ensuring that the aquatic environment forms a water flow circulation, so that fish can grow in a similar natural river and sea environment. Meanwhile, the dissolved oxygen in water is increased, and microorganisms in the water are sufficiently communicated with one another, so that an aquatic environment beneficial to the growth and development of the fish is created. However, water flow produced by wave-making pumps in the current market is generally sprayed in a water column shape, and the water flow is too concentrated and the sprayed water is too intensive, so that the use effect of the wave-making pumps is not good.

BRIEF SUMMARY OF THE INVENTION

The utility model aims at providing a wave-making pump, with a novel directional structure, capable of overcoming the above problems, the produced water flow of which is wide, soft, uniform and more approximate to water flow in the natural environment.

The purpose of the wave-making pump is realized as follows: the wave-making pump comprises a casing, a motor, an impeller and a fixing device, wherein the motor is fixed in the casing; the impeller is arranged at the output end of the motor; the fixing device is used for fixing the casing; the wave-making pump is characterized in that the casing comprises a rear casing and a diversion protective cover arranged on the front side of the rear casing; openings are formed in the two ends of the diversion protective cover; a hollow groove helically extending is formed in the peripheral surface of the diversion protective cover.

In the aforesaid structure, a diversion bar forming an 8 shape along the axis of the diversion protective cover is arranged at the opening, far from the motor, of the diversion protective cover.

In the aforesaid structure, a tapered arrangement is adopted from one end, close to the motor, of the diversion protective cover to the other end far from the motor, so that the diversion protective cover is provided with a large end opening and a small end opening.

In the aforesaid structure, the hollow groove is provided with four reinforcing ribs extending from the large end opening to the small end opening.

In the aforesaid structure, the four reinforcing ribs are uniformly arranged along the circumferential direction of the diversion protective cover.

In the aforesaid structure, the fixing device comprises an outer magnetic sucker, an inner magnetic sucker and a ferromagnetic body arranged in the rear casing, wherein the outer magnetic sucker and the inner magnetic sucker are both provided with a magnet; the outer magnetic sucker and the inner magnetic sucker attract each other to clamp the wall of an aquarium; the ferromagnetic body and the inner magnetic sucker attract each other, so as to ensure that the rear casing is connected with the wall of the aquarium.

In the aforesaid structure, the rear casing is provided with an arc surface, and the inner magnetic sucker is provided with an arc concave surface corresponding to the arc surface.

In the aforesaid structure, the ferromagnetic body is an iron ring.

As the hollow groove helically extending is formed in the peripheral surface of the diversion protective cover, the water flow produced by wave-making pump with the novel directional structure is wider, softer and more uniform, and the aquatic environment closer to the natural ecological water wave is convenient to create.

BRIEF DESCRIPTION OF THE DRAWINGS

The invention will now be described in further details with reference to the attached drawings.

Figure 1:
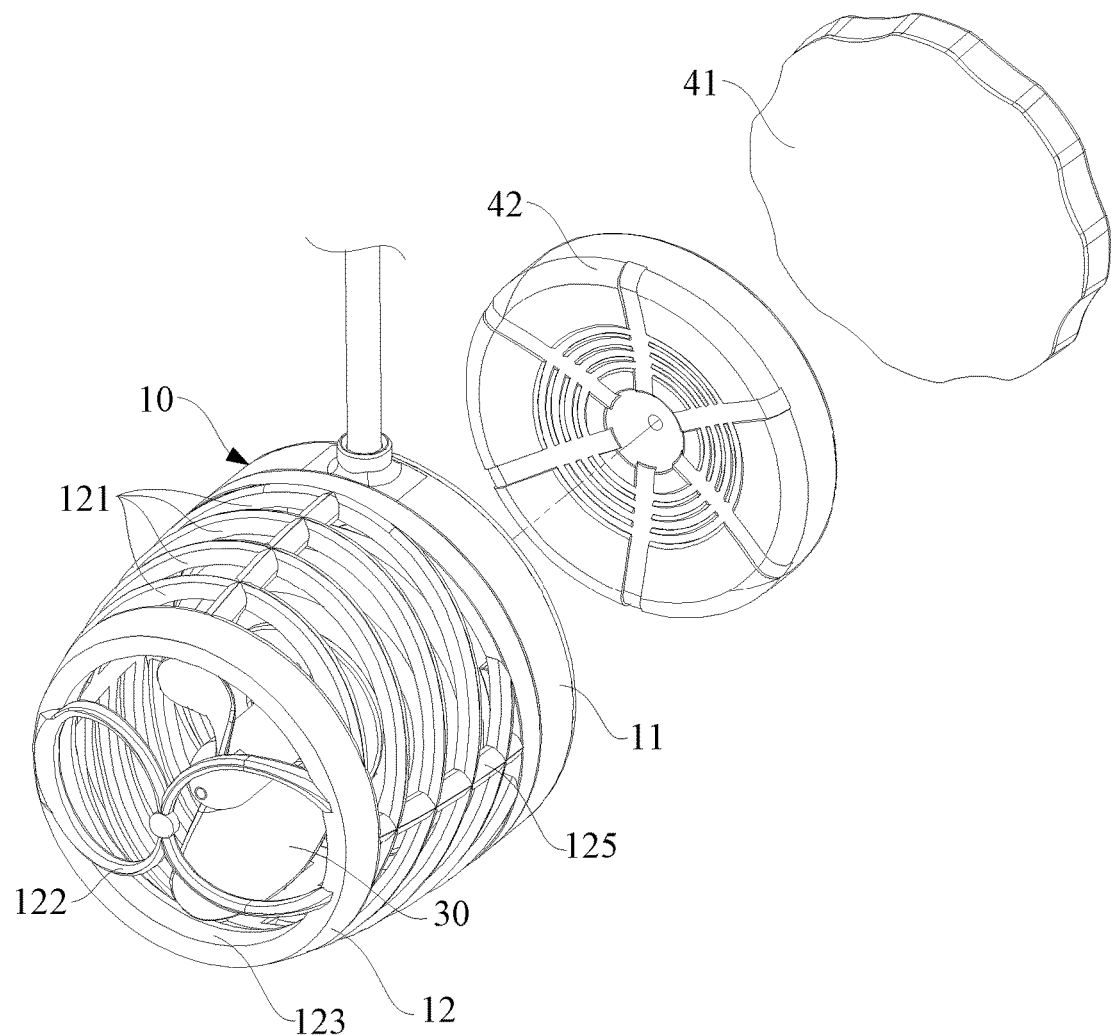
FIG. 1 is an overall structure schematic diagram of the wave-making pump with a novel directional structure of the utility model.

In the drawings: a casing 10; a rear casing 11; an arc surface 111; a diversion protective cover 12; a hollow groove 121; a diversion bar 122; a large end opening 123; a small end opening 124; reinforcing ribs 125; a motor 20; an impeller 30; a fixing device 40; an outer magnetic sucker 41; an inner magnetic sucker 42; an arc concave surface 421; a ferromagnetic body 43; a power adapter 50; a controller 60.

DETAILED DESCRIPTION OF THE INVENTION

Figure 2:
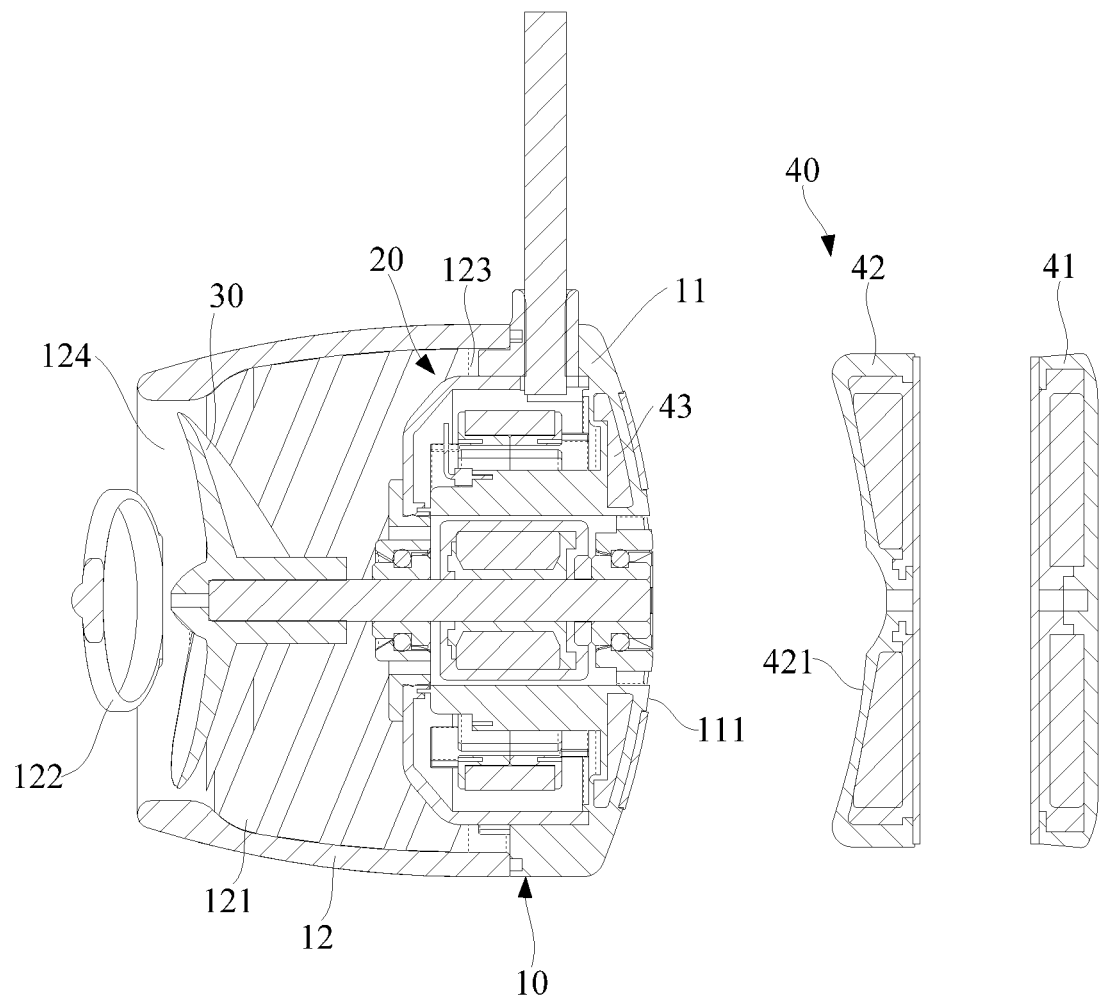
FIG. 2 is a cross-sectional structure schematic diagram of the wave-forming pump with a novel directional structure of the utility model.
Figure 3:
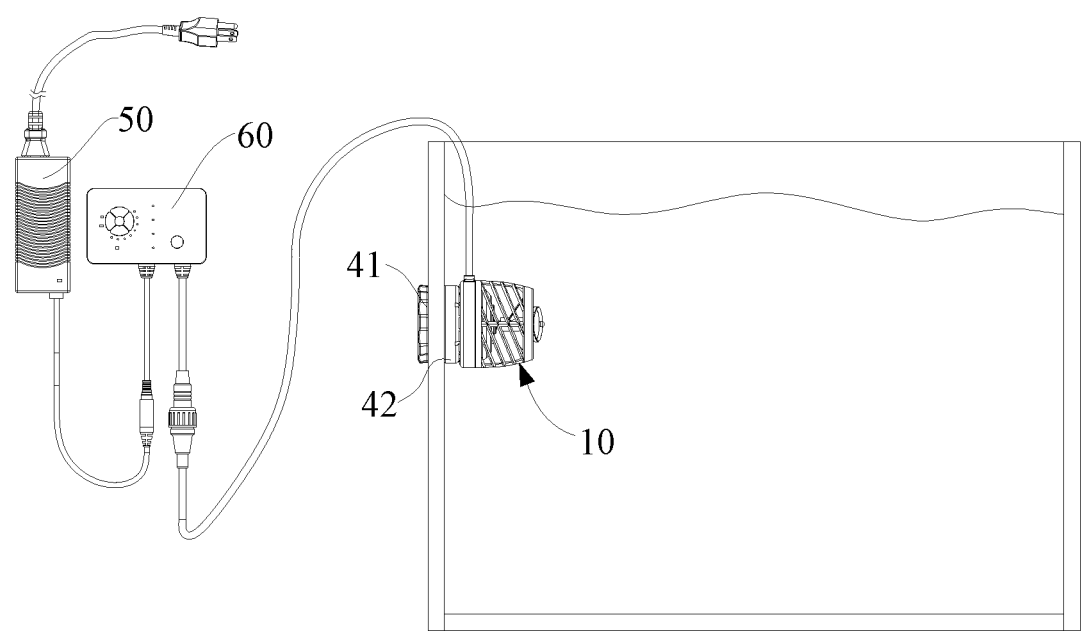
FIG. 3 is a tested operation state diagram of the wave-forming pump with a novel directional structure of the utility model.

As shown in FIG. 1-FIG. 2, the wave-making pump with a novel directional structure of the utility model comprises a casing 10, a motor 20, an impeller 30 and a fixing device 40. The wave-making pump, with the novel directional structure, is externally connected with an electric supply and is provided with a power adapter 50, so as to provide electric power for the wave-making pump with the novel directional structure, and meanwhile is further provided with a controller 60, so as to control the wave-making pump with the novel directional structure. The motor 20 is fixed in the casing 10, and the impeller 30 is arranged at the output end of the motor 20, so as to produce water waves. The casing 10 comprises a rear casing 11 and a diversion protective cover 12 arranged on the front side of the rear casing 11, wherein openings are formed in the two ends of the diversion protective cover 12; a hollow groove 121 spirally extending is formed in the circumferential surface of the diversion protective cover 12. The fixing device 40 is used for fixing the casing 10 in a magnetic catche manner, and comprises an outer magnetic sucker 41, an inner magnetic sucker 42 and a ferromagnetic body 43 arranged in the casing; specifically the ferromagnetic body 43 adopts an iron ring; a magnet is arranged in both the outer magnetic sucker 41 and the inner magnetic sucker 42 (as shown in FIG. 3); during mounting, the outer magnetic sucker 41 and the inner magnetic sucker 42 attract each other to clamp the wall of an aquarium, and then the rear casing with the iron ring is sucked on the inner magnetic sucker 42. Meanwhile, an arc surface is arranged on the rear casing; the inner magnetic sucker is provided with an arc concave surface corresponding to the arc surface; angle adjustment can be convenient to perform after the rear casing is close to the inner magnetic sucker.

Further, as shown in FIG. 1 to FIG. 2, a diversion bar 122 forming an 8 shape along the axis of the diversion protective cover 12 is arranged at the opening, far from the motor 20, of the diversion protective cover 12.

Further, a tapered arrangement is adopted from one end, close to the motor 20, of the diversion protective cover 12 to the other end far from the motor 20, so that the diversion protective cover 12 is provided with a large end opening 123 and a small end opening 124.

Further, the hollow groove 121 is provided with four reinforcing ribs 125 extending from the large end opening 123 to the small end opening 124.

Further, the four reinforcing ribs 125 are uniformly arranged along the circumferential direction of the diversion protective cover 12.

The aforesaid contents are only preferred embodiments of the patent, and are not intended to limit the scope of the patent, and any equivalent structures or equivalent process transformations, which are made using the description and the contents of the drawings, is directly or indirectly applied to other relevant technical fields, and belong to the protection scope of the patent.

What is claimed is:

1. A wave-making pump, comprising a casing, a motor, an impeller that produces a wave, and a fixing device, wherein the motor is fixed in the casing; the impeller is arranged at an output end of the motor; the fixing device is used for fixing the casing; the wave-making pump is characterized in that the casing comprises a rear casing and a diversion protective cover arranged on a front side of the rear casing; openings are formed at two ends of the diversion protective cover; a hollow groove helically extending is formed in peripheral surface of the diversion protective cover; a diversion bar forming an 8 shape along an axis of the diversion protective cover is arranged at one of the openings far from the motor, of the diversion protective cover; the fixing device comprises an outer magnetic sucker, an inner magnetic sucker and a ferromagnetic body arranged in the rear casino, wherein both the outer magnetic sucker and the inner magnetic sucker are provided with a magnet; the outer magnetic sucker and the inner magnetic sucker attract each other to clamp a wall of an aquarium; the ferromagnetic body and the inner magnetic sucker attract each other, so as to ensure that the rear casing is connected with the wall of the aquarium.

2. The wave-making pump according to the claim 1, characterized in that a tapered arrangement is adopted from one end, close to the motor, of the diversion protective cover to another end far from the motor, so that the diversion protective cover is provided with a large end opening and a small end opening.

3. The wave-making pump according to the claim 2, characterized in that a hollow groove is provided with four reinforcing ribs extending from the large end opening to the small end opening.

4. The wave-making pump according to the claim 3, characterized in that the four reinforcing ribs are uniformly arranged along a circumferential direction of the diversion protective cover.

5. The wave-making pump according to claim 1, characterized in that the rear casing is provided with an arc surface, and the inner magnetic sucker is provided with an arc concave surface corresponding to the arc surface.

6. The wave-making pump according to the claim 5, characterized in that the ferromagnetic body is an iron ring.

* * * * *